United States Patent
Martinez

(10) Patent No.: US 6,594,757 B1
(45) Date of Patent: Jul. 15, 2003

(54) REMOTE BIOS UPGRADE OF AN APPLIANCE SERVER BY REBOOTING FROM UPDATED BIOS THAT HAS BEEN DOWNLOADED INTO SERVICE PARTITION BEFORE FLASHING PROGRAMMABLE ROM

(75) Inventor: Jesus A. Martinez, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/513,304

(22) Filed: Feb. 25, 2000

(51) Int. Cl.⁷ ................................ G06F 9/24
(52) U.S. Cl. .................. 713/2; 709/221; 717/173
(58) Field of Search .............. 713/2, 100; 709/220; 717/173, 178

(56) References Cited

U.S. PATENT DOCUMENTS

| | | | | |
|---|---|---|---|---|
| 5,734,831 A | * | 3/1998 | Sanders | 709/223 |
| 5,859,911 A | * | 1/1999 | Angelo et al. | 713/187 |
| 5,925,140 A | * | 7/1999 | Hudson | 714/52 |
| 5,974,517 A | * | 10/1999 | Gaudet | 711/112 |
| 6,223,284 B1 | * | 4/2001 | Novoa et al. | 713/100 |
| 6,345,294 B1 | * | 2/2002 | O'Toole et al. | 709/222 |
| 6,370,141 B1 | * | 4/2002 | Giordano et al. | 370/386 |
| 6,487,464 B1 | * | 11/2002 | Martinez et al. | 700/79 |

FOREIGN PATENT DOCUMENTS

| | | | | |
|---|---|---|---|---|
| EP | 848341 A2 | * | 6/1998 | G06F/17/30 |
| JP | 2001101018 A | * | 4/2001 | G06F/11/00 |

OTHER PUBLICATIONS

IBM Technical Disclosure Bulletin, "Reliability Enhancement for Remote Booting Computers", vol. 40, pp. 57–60, Nov. 1997.*

* cited by examiner

Primary Examiner—Thomas Lee
Assistant Examiner—Albert Wang
(74) Attorney, Agent, or Firm—Fish & Richardson P.C.

(57) ABSTRACT

An appliance server system having remote-configurable capability is disclosed. The server system includes a server, a remote interfacing computer, and a network connection. The server receives and extracts configuration upgrade information. The remote interfacing computer formulates and provides the configuration upgrade information. The network connection couples the server to the remote interfacing computer.

12 Claims, 5 Drawing Sheets

REMOTE BIOS UPGRADE OF AN APPLIANCE SERVER BY REBOOTING FROM UPDATED BIOS THAT HAS BEEN DOWNLOADED INTO SERVICE PARTITION BEFORE FLASHING PROGRAMMABLE ROM

BACKGROUND

This disclosure relates to upgrading Basic Input/Output System (BIOS) memories, and specifically to remote upgrading of such a memory.

Small businesses are embracing computers, but are often hard-pressed to find an affordable, simple way to network those computers in the workplace. Servers are often too complex and expensive for small business owners, so they may forego such necessities as file sharing, backup, email, firewall and shared office-wide network access.

Appliance servers are reduced function servers that allow only certain functions to be carried out. Many appliance servers are turned on, set up and then left alone. They often have limited user interfaces, the so-called "headless" system. However, the performance of these server computers is often affected by Basic Input/Output System (BIOS) settings.

The BIOS settings allow the user to specify how fast the computer reads from memory, whether or not the cache is enabled or disabled, and how fast the Peripheral Component Interconnect (PCI) bus communicates with its adaptor cards. The BIOS memory stores the basic software settings to provide for initial system setup and configuration. It allows the system to load and execute subsequent programs. Computer operating system and other applications, such as DOS™ and Windows™, can use the BIOS instructions to communicate with the computer's input and output devices. Since this configuration software must be available to the system when it is first started, the BIOS memory must be non-volatile.

In some systems, it is sufficient to supply a read-only memory that is hard-coded with the BIOS software. However, BIOS software is often upgraded when necessary. Therefore, many of today's systems use "flash" or electrically erasable programmable read-only memories (EEPROM) to store the BIOS software. With flash BIOS, the BIOS image or a portion of the BIOS image can be updated by a software update. The new software, or "flash" information, is stored onto a storage device and executed to write the new software into the BIOS memory to perform the update. This procedure is commonly referred to as "flashing" the memory.

BRIEF DESCRIPTION OF THE DRAWINGS

Different aspects of the disclosure will be described in reference the accompanying drawings wherein.

DETAILED DESCRIPTION

Figure 1:
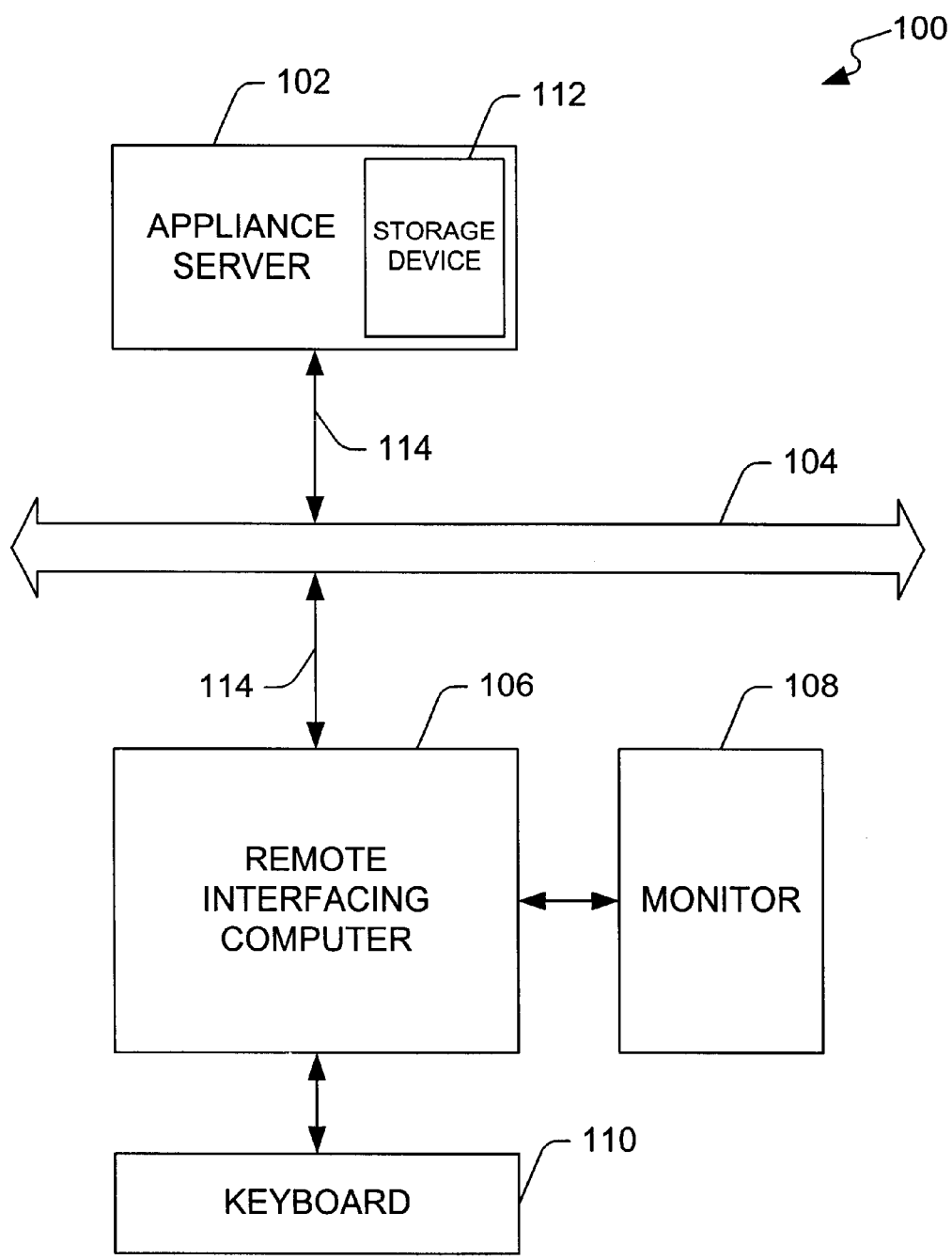
FIG. 1 is a system level block diagram of a server system according to one embodiment.

A system level block diagram of a server system 100 having an appliance server 102 is shown in FIG. 1. A remote interfacing computer 106, a monitor 108, and a keyboard 110 are connected. Administrative commands are sent from the remote interfacing computer 106 to the appliance server 102 over a network connection 104. The network connection 104 can be a local area network (LAN) or a wide area network (WAN) such as the Internet.

The remote interfacing computer 106 can provide instructions including Basic Input/Output System (BIOS) upgrade information. The BIOS upgrade is performed by downloading or storing the BIOS upgrade software onto a storage device 112 and executing a program to write the new software into the BIOS memory. Since the server 102 can be fully administered and reconfigured from a remote location, the "headless" server 102 functions without a terminal display or any physical input devices such as a keyboard or a mouse. The Web-based management interface 114 is designed to simplify administration of the appliance server 102.

Figure 2:
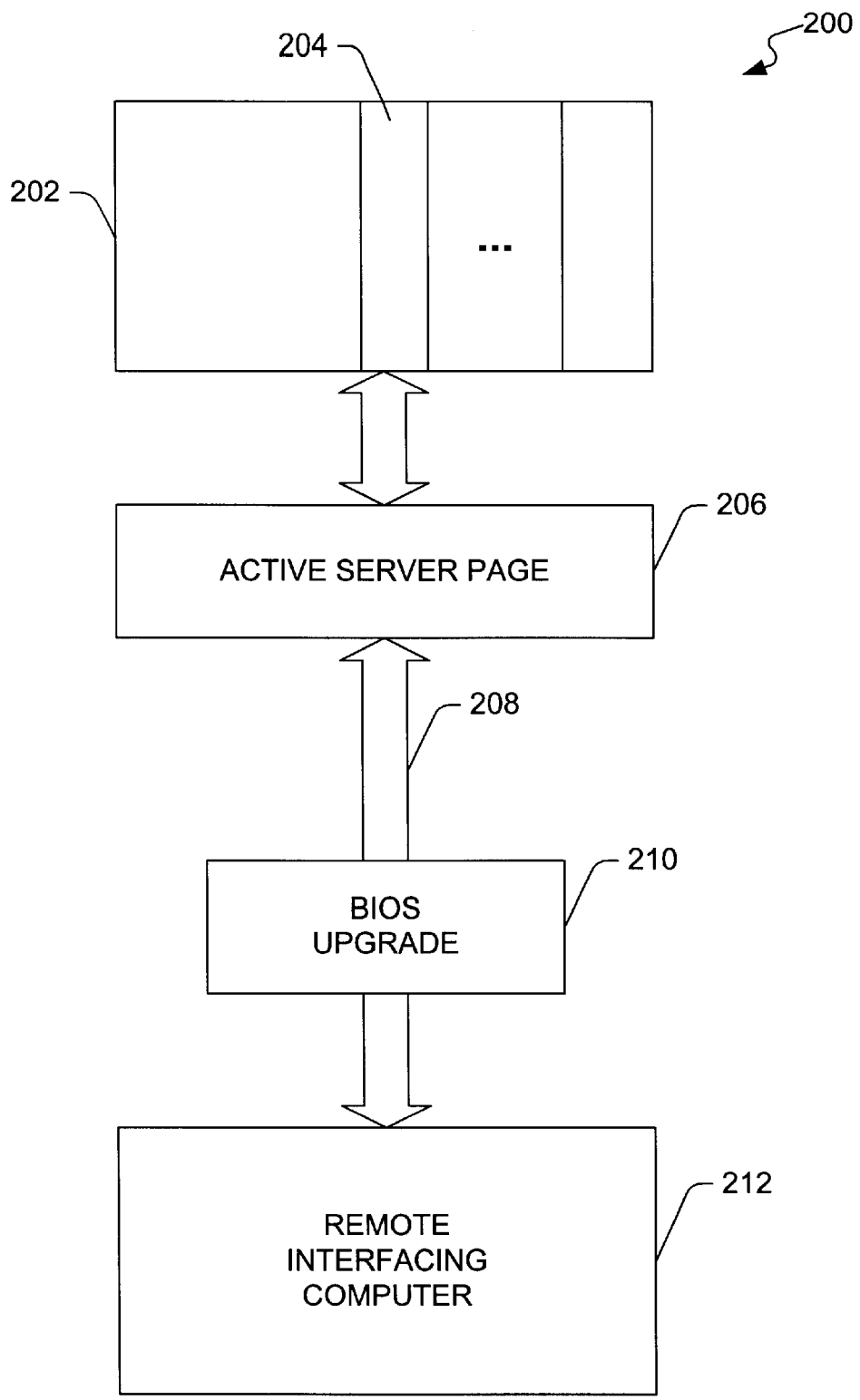
FIG. 2 illustrates another embodiment of the server system configured to provide BIOS upgrade.

FIG. 2 illustrates another embodiment of the server system 200 as configured to provide a BIOS upgrade 210. The BIOS upgrade 210 is formulated in the remote interfacing computer 212 and is sent over a channel 208, e.g. a network. In this embodiment, the BIOS upgrade 210 is downloaded into an area 204 of a storage device 202 through a web page scripting element, which may include an Active Server Page (ASP) 206.

The Active Server Page 206 itself is simply a text file script with the extension asp containing hypertext markup language (HTML), client- and server-side script. The implementation behind the Active Server Page 206 was created by Microsoft™ and intended as an open technology server-side framework. Using the Active Server Page 206, web developers can develop dynamic web sites using information accessed from the many component object model (COM)-compliant data sources available to them. The syntax and grammar of the Active Server Page 206 supports some interaction between page user and server. The Active Server Page 206 also allows web page access to databases and directory services. Further, any standard COM object can be incorporated into a page.

The storage device 202 can have a special hidden partition, referred to as a Service Partition 204. The downloaded BIOS upgrade 210 can be stored in the Service Partition 204. This Service Partition 204 in the appliance server's hard drive 202 can be configured to provide an appropriate environment to run remote applications and diagnostics. Thus, the remote interfacing computer 212 can extract BIOS upgrade 210 into the Service Partition 204, and then signal the boot-up program to "flash" or upgrade the BIOS memory.

In the illustrated embodiment of FIG. 2, the server system 200 has a Service Partition 204 installed on the storage device 202. The BIOS memory and firmware can support booting the Service Partition 204. Further, the operating system on the appliance server can have a Web server installed, which supports a scripting element such as an Active Server Page 206.

Figure 3A:
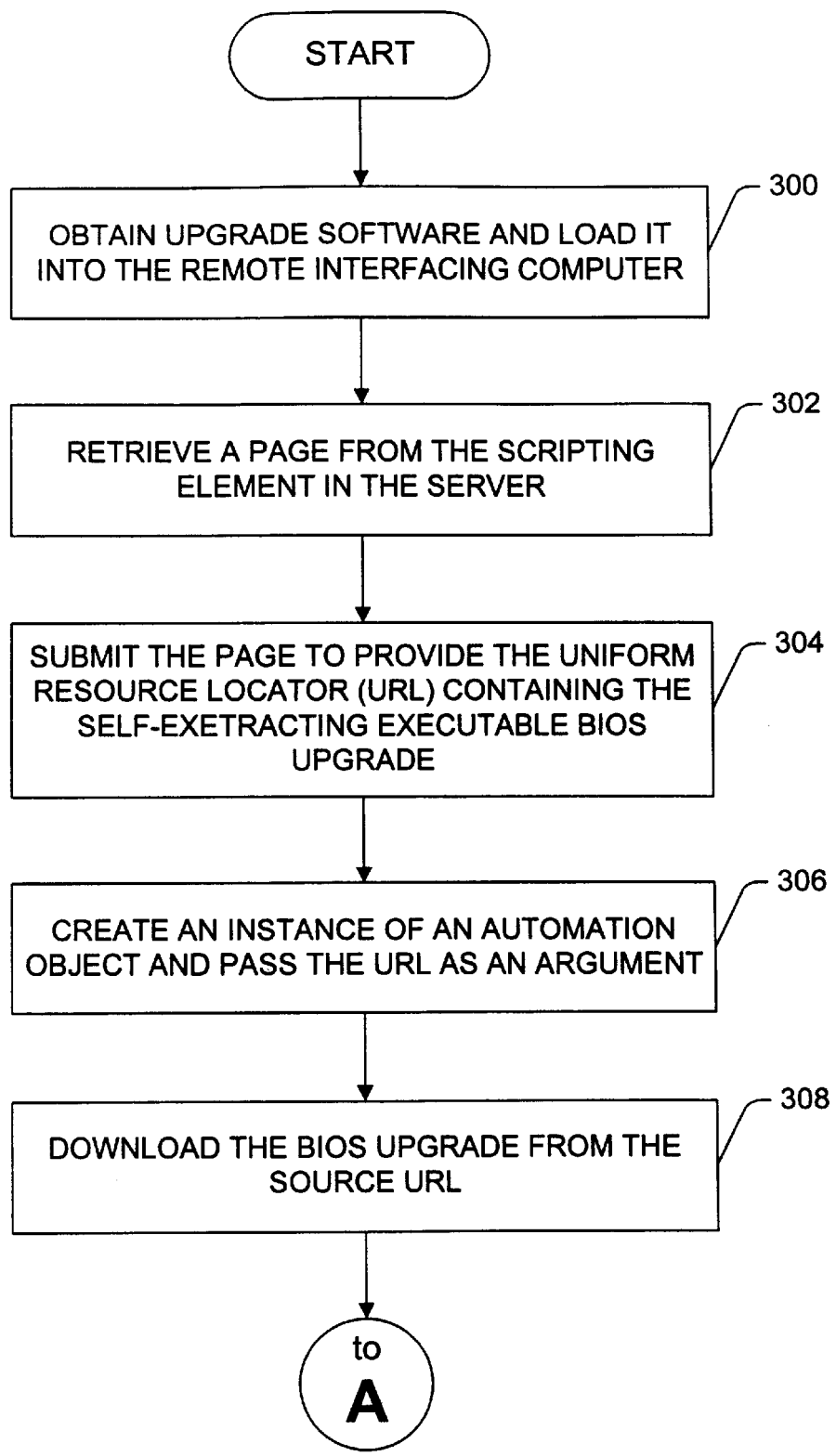
FIG. 3 is a flowchart of remote BIOS upgrade process according an embodiment of the present invention.
Figure 3B:
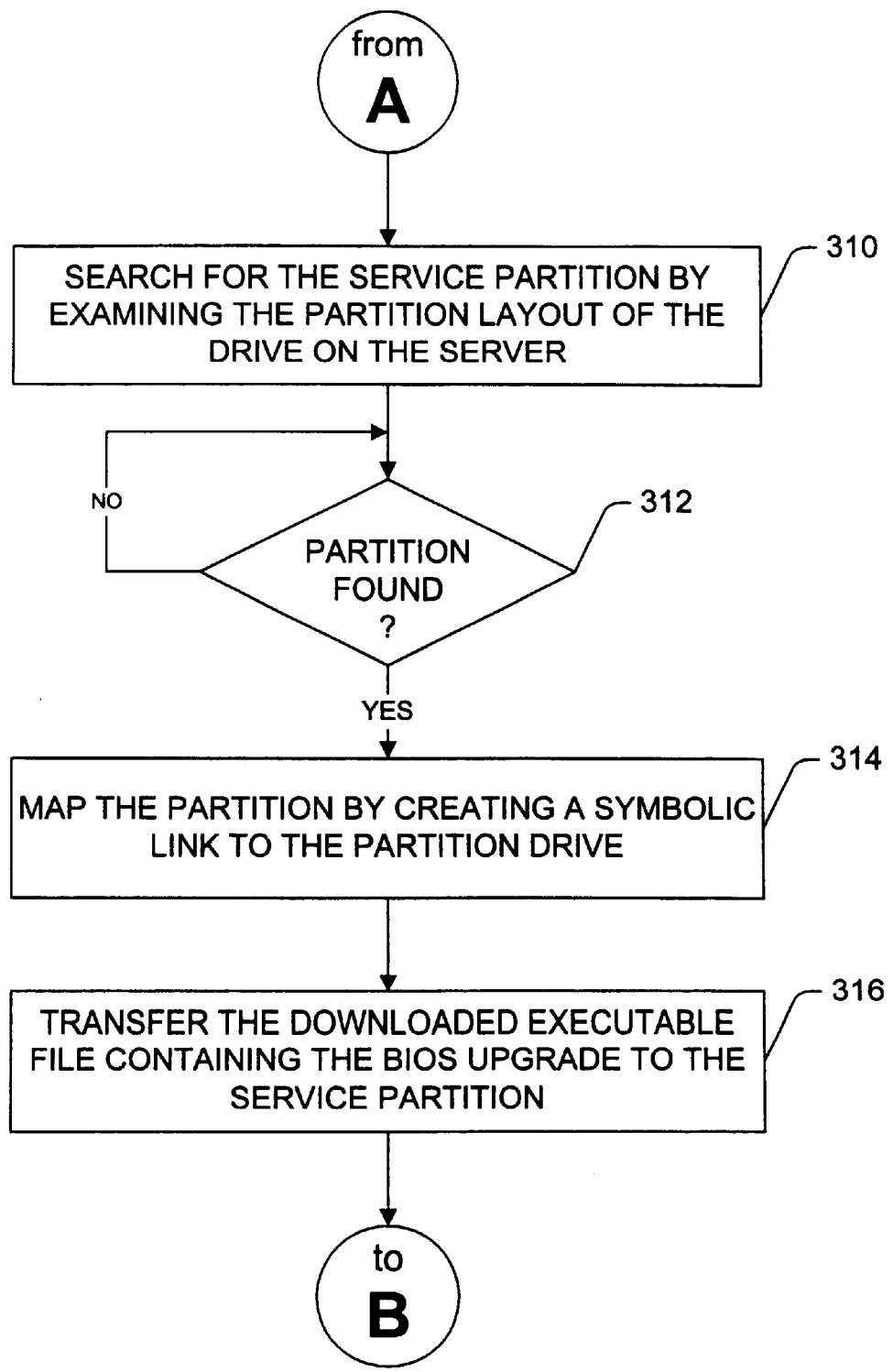
Figure 3C:
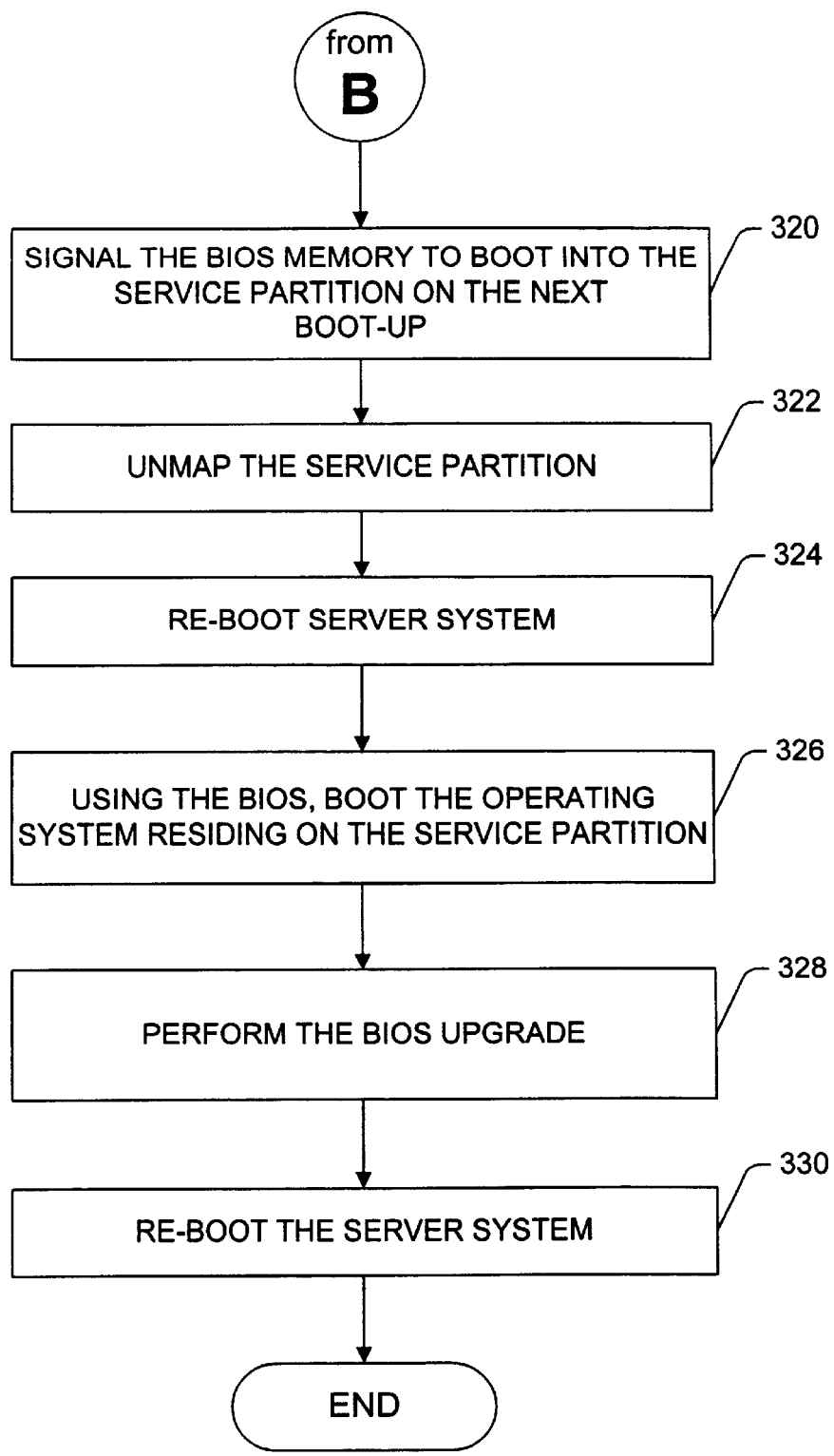

FIG. 3 shows a remote BIOS upgrade process according to one embodiment of the present invention. At 300, an administrator/user at the remote interfacing computer obtains the upgrade software and loads the software into the remote computer. Once the upgrade software is loaded, the remote user retrieves a page from the scripting element in the server or target system at 302. The remote user then submits the retrieved page to provide a Uniform Resource Locator (URL) containing the BIOS upgrade at 304. For one embodiment, the BIOS upgrade can be a self-extracting executable file.

At 306, the scripting element creates an instance of an automation object, and passes the Uniform Resource Locator as an argument to the object. When the automation object receives the Uniform Resource Locator, it downloads the BIOS upgrade from the source Uniform Resource Locator at 308. The automation object then searches for the Service Partition by examining the partition layout of the storage device/drive on the appliance server at 310. If the partition is found at 312, the object maps the partition by creating a symbolic link to the partition drive at 314. This causes the file system driver to recognize the Service Partition. Thus, the Service Partition can be accessed like any other drive. Otherwise, if the partition is not found, the object continues its search.

Once the Service Partition is mapped, the object transfers the downloaded executable file containing the BIOS upgrade to the Service Partition at 316. At 320, the object signals the BIOS memory to boot into the Service Partition on the next boot-up. The object then unmaps the Service Partition at 322, and causes the server system to re-boot at 324.

On the next boot-up of the server system, the operating system residing on the Service Partition is booted up using the BIOS at 326. In a particular embodiment, a boot-up batch file, such as an autoexec.bat file in the Service Partition invokes memory "flash" to upgrade the BIOS at 328. When the memory "flash" is done, server system re-boots at 330. The server system boots into the new BIOS and the normal operating system.

The advantages of this server system 200 include remote administration capability using simplified administrative tools. The capability allows the server to be headless since it does not need dedicated disk drive for the BIOS functions. This provides time savings for the system administrators and database users, who are implementing the use of the system. Also, the reduction in complexity of the server system can increase the system's reliability and availability. The reduction in complexity of the system can include elimination of unnecessary devices, intricate installation steps, and complicated user interfaces. Further, the remote-interface-capable server system 200 can provide point solutions to direct network needs in the absence of Information Technology (IT) expertise. With the present server system 200, services can be relied upon with minimal downtime and limited user intervention.

The above embodiments are for illustrative purposes Other embodiments and variations are possible. For example, the scripting element 206 can use Common Gateway Interface (CGI) and Perl instead of the Active Server Page (ASP). The CGI can introduce some interaction to their All these are intended to be encompassed by the following claims.

What is claimed is:

1. An appliance server system comprising:

a server including a programmable Read Only Memory (ROM) including a Basic Input/Output System (BIOS);

a storage device partitioned into a plurality of different partitions, said plurality of different partitions including a service partition to store an updated BIOS;

an upgrade element operative to cause the server to re-boot off of the updated BIOS in the service partition, write the updated BIOS to the programmable ROM, and then re-boot from the updated BIOS on the programmable ROM;

a network connection coupled to the server; and a remote administrator coupled to the server via said network connection operative to initiate a download of the upgraded BIOS to the partition.

2. The system of claim 1, wherein said server is a "headless" server that functions without a terminal display or any physical input devices such as keyboard or mouse.

3. The system of claim 1, wherein said Basic Input/Output System (BIOS) upgrade information is stored at a site addressed by a Uniform Resource Locator (URL).

4. The system of claim 1, wherein said remote administrator includes a monitor and a keyboard.

5. A method comprising:

obtaining remote upgraded Basic Input/Output System (BIOS) information;

transferring said upgraded BIOS information into a designated partition of a storage device at a headless client;

re-booting the headless client using the upgraded BIOS information in the designated partition;

upgrading BIOS information in a programmable Read Only Memory (ROM) in said headless client based on said upgraded BIOS information; and re-booting the headless client using the upgraded BIOS information in the programmable ROM.

6. The method of claim 5, further comprising: retrieving a page from a scripting element; and submitting the page to provide a location where the upgraded BIOS is stored.

7. The method of claim 6, wherein said location is indicated by a Uniform Resource Locator (URL).

8. The method of claim 6, further comprising: creating an instance of an automation object; and passing the upgrade information location as an argument to said automation object.

9. The method of claim 8, further comprising: downloading the configuration upgrade information from the upgrade information location.

10. The method of claim 5, wherein said upgrading BIOS information in the programmable ROM includes: invoking memory flash.

11. An apparatus comprising a computer-readable storage medium having executable instructions that enable the computer to:

obtain remote upgraded Basic Input/Output System (BIOS) information;

transfer said upgraded BIOS information into a designated partition of a storage device at a headless client;

re-boot the headless client using the upgraded BIOS information in the designated partition;

upgrade BIOS information in a programmable Read Only Memory (ROM) based on said upgraded BIOS information; and re-booting the headless client using the upgraded BIOS information in the programmable ROM.

12. The apparatus of claim 11, wherein the instructions for upgrading the BIOS information includes instructions that enable the computer to:

invoke memory flash.

* * * * *